(12) United States Patent  
Algreatly

(10) Patent No.: US 8,711,109 B2  
(45) Date of Patent: Apr. 29, 2014

(54) TOUCH SENSING TECHNOLOGY

(75) Inventor: Cherif Atia Algreatly, Newark, CA (US)

(73) Assignee: Cherif Algreatly, Palo Alto, CA (US)

( * ) Notice: Subject to any disclaimer, the term of this patent is extended or adjusted under 35 U.S.C. 154(b) by 573 days.

(21) Appl. No.: 12/587,339

(22) Filed: Oct. 6, 2009

(65) Prior Publication Data

US 2010/0090973 A1 Apr. 15, 2010

Related U.S. Application Data

(60) Provisional application No. 61/195,881, filed on Oct. 10, 2008, provisional application No. 61/196,630, filed on Oct. 20, 2008, provisional application No. 61/203,762, filed on Dec. 29, 2008, provisional application No. 61/203,763, filed on Dec. 29, 2008.

(51) Int. Cl.
*G06F 3/041* (2006.01)

(52) U.S. Cl.
USPC ........................................ 345/173; 178/18.01

(58) Field of Classification Search
USPC ................................ 345/156–179; 178/18.01
See application file for complete search history.

(56) References Cited

U.S. PATENT DOCUMENTS

| | | | | |
|---|---|---|---|---|
| 5,729,249 A * | 3/1998 | Yasutake | ...................... | 345/173 |
| 5,982,352 A * | 11/1999 | Pryor | ............................. | 345/156 |
| 6,278,443 B1 * | 8/2001 | Amro et al. | ................... | 345/173 |
| 6,492,978 B1 * | 12/2002 | Selig et al. | ..................... | 345/173 |
| 6,597,347 B1 * | 7/2003 | Yasutake | ....................... | 345/173 |
| 6,888,536 B2 * | 5/2005 | Westerman et al. | .......... | 345/173 |
| 7,157,649 B2 * | 1/2007 | Hill | ............................. | 178/18.04 |
| 7,176,904 B2 * | 2/2007 | Satoh | ............................ | 345/173 |
| 7,183,948 B2 * | 2/2007 | Roberts | .......................... | 341/34 |
| 7,184,898 B2 * | 2/2007 | Sullivan et al. | ................ | 702/56 |
| 7,190,350 B2 * | 3/2007 | Roberts | ......................... | 345/173 |
| 7,212,197 B1 * | 5/2007 | Schkolne et al. | ............. | 345/419 |
| 7,277,087 B2 * | 10/2007 | Hill et al. | ...................... | 345/173 |
| 7,330,198 B2 * | 2/2008 | Yamaguchi et al. | .......... | 345/653 |
| 7,812,826 B2 * | 10/2010 | Ording et al. | ................. | 345/173 |
| 8,077,161 B2 * | 12/2011 | Kinoshita et al. | ............. | 345/174 |
| 8,089,474 B2 * | 1/2012 | Geaghan et al. | ............. | 345/174 |
| 8,232,900 B2 * | 7/2012 | Takeda | ....................... | 340/995.2 |

* cited by examiner

*Primary Examiner* — William Boddie
*Assistant Examiner* — Mansour M Said

(57) ABSTRACT

The present touch sensing technology enables detecting the position of touch between an object and a surface, and the direction of this object in three dimensions while touching the surface. Said object can be a user's finger, a pen, or the like, while said surface can be a touchpad, a touch screen, a computer mouse, a button of a computer keyboard, a 3D computer input device, or the like.

14 Claims, 6 Drawing Sheets

TOUCH SENSING TECHNOLOGY

CROSS-REFERENCE TO RELATED APPLICATION

This application claims the benefits of U.S. Provisional Patent Applications No. 61/195,881, filed Oct. 10, 2008, titled "Pressure Sensitive Computer Mouse", No. 61/196,630, filed Oct. 20, 2008, titled "Touch Sensing Technology", No. 61/203,762, filed Dec. 29, 2008, titled "Portable Touch Screen", and No. 61/203,763, filed Dec. 29, 2008, titled "3D Pointing Stick and Touchpad".

BACKGROUND

The present invention introduces a new touch sensing technology that can be implemented in various computer input devices such as the touchpad, the touch screen, the computer mouse, the computer keyboard, the pointing stick, the three-dimensional computer input devices, or the like. The main advantage of the present touch sensing technology is converting the form and function of the traditional computer input devices into an innovative form and function that enable the user to perform his/her tasks in an easier and faster manner in different environments or conditions.

For example, the present touch sensing technology converts the traditional touchpad into an innovative touchpad that can detect not only the position of the finger along its surface but also the direction of the exerted force from the finger in three dimensions on the touchpad surface. In other words, the traditional touchpad is converted from a two-dimensional input device into a three-dimensional input device that manipulates the objects to move in 3D on the computer display. Also the present touch sensing technology converts the traditional touch screen into a portable thin sheet that an be attached to a regular computer display to turn it into a touch screen where the user can detach this thin sheet form the computer display and fold it when s/he finishes his/her task.

The present invention enables using the computer mouse without moving it on a surface where the user slightly touches the computer mouse to manipulate the cursor to move on the computer display. This possibility enables the user to use the computer mouse when there is no enough space or surface for the mouse movement, or when the user is away form his/her desk. The present touch sensing technology can be employed with the buttons of the computer keyboard to enable the keyboard buttons to detect the direction of the user's finger while touching the buttons or typing. In such case each different direction of the user's finger can be interpreted to provide the computer system with a unique input representing a shortcut similar to the keyboard shortcuts that are used in modern software applications.

The present touch sensing technology can be utilized with the traditional pointing stick to convert it into a three-dimensional pointing stick that enables the user with one finger to manipulate the objects to move or rotate in three dimensions on the computer display with a full control of the speed of the objects movement or rotation. Moreover, utilizing the present invention converts the complex designs of various 3D computer input devices into simple designs that enable the user to operate said 3D computer input devices in an intuitive manner saving the user's time and increasing his/her productivity.

SUMMARY

The present invention is comprised of a touch surface which is a flat surface that can be touched by the user's finger, and a number of force sensors that are connected to the touch surface at certain positions. When the user touches the touch surface at a touch point specific forces are exerted on said certain positions where the force sensors detect these forces. An algorithm is utilized to compute the position of the touch point along the touch surface, in addition to, the value and the 3D direction of the exerted force from the user's finger on the touch surface.

In one embodiment the touch surface of the present invention can be utilized to function as a 2D/3D touchpad that manipulates the objects to move in two or three-dimensions on the computer display. In other embodiments, said touch surface can be in a form of a thin transparent sheet that can be attached to a computer display to manipulate the cursor to simultaneously move on the computer display with the finger movement on said thin transparent sheet, in other words, functioning like a touch screen.

In further embodiments, said touch surface can be a chasses of a mouse that can be held by the user's hand to manipulate the cursor to move on the computer display without moving the mouse on a surface. In certain alternate embodiments, said touch surface can be a keyboard button that detects the direction of the finger in three dimensions while typing, where each finger direction can provide a different input to the computer system. In some embodiments, said touch surface can be in a form of a hollow sphere where the user can insert his/her finger inside it to point in a specific 3D direction to manipulate the objects to move in the same 3D direction on the computer display.

DETAILED DESCRIPTION

Figure 1:
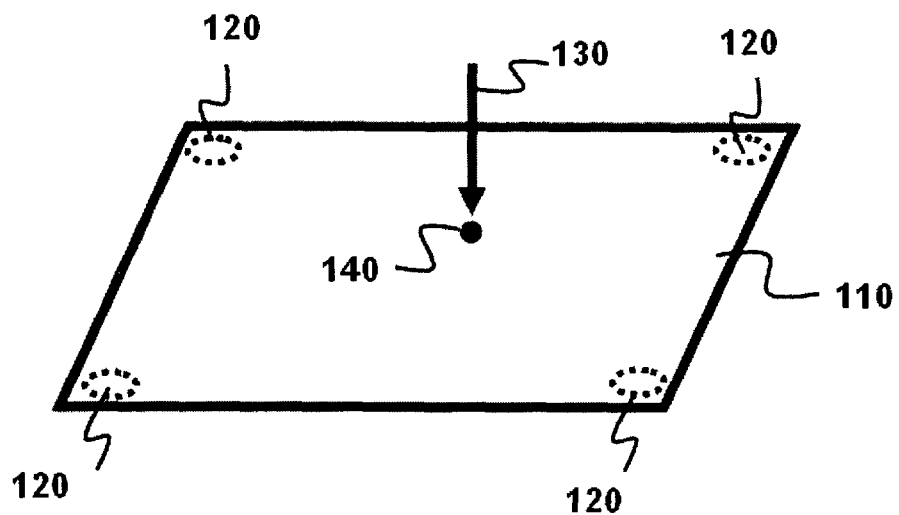
FIG. 1 is a vertical force exerted on a surface connected to four force sensors.
Figure 2:
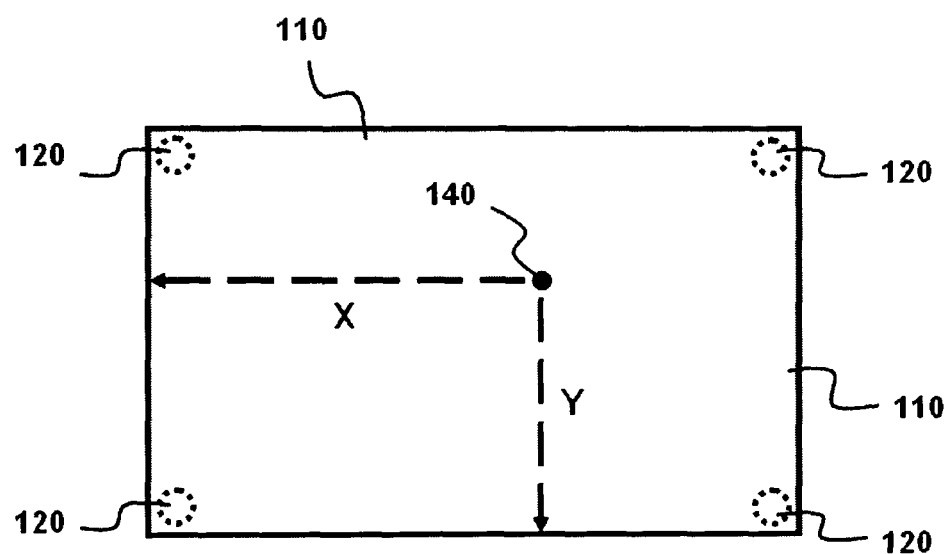
FIG. 2 is a top view for the elements of FIG. 1

The present invention of touch sensing technology can be implemented in various forms. For example, FIG. 1 illustrates a touch surface 110 which is a rectangular surface positioned to be parallel to the xy-plane on four force sensors 120 that are located beneath the four corners of the touch surface, where a vertical force 130 is exerted on the touch surface at a touch point 140. FIG. 2 illustrates a top view for the touch surface and the four force sensors of FIG. 1, where x and y represent the Cartesian coordinates of the touch point relative to an origin which is the left bottom corner of the touch surface.

The value of the vertical force can be computed by adding the four values of the four forces or reactions that are exerted at the positions of the four force sensors, whereas these four reactions represented by the output of the four force sensors. The position of the touch point can be computed by solving the equilibrium equations of the vertical force and the four reactions of the four force sensors as will be described subsequently. When the vertical force is moved on the touch surface the successive positions of the points of touch can be computed to represent the path of the vertical force movement on the touch surface. The vertical force can be any object that has a weight such as a user's finger, a pen, or the like.

Figure 3:
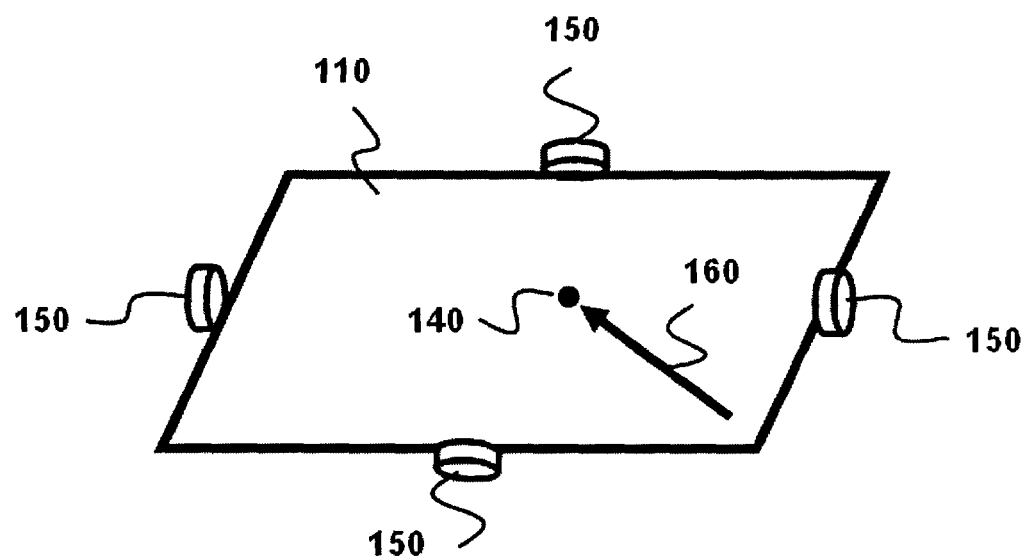
FIG. 3 is a horizontal force exerted on a surface connected to four force sensors.
Figure 4:
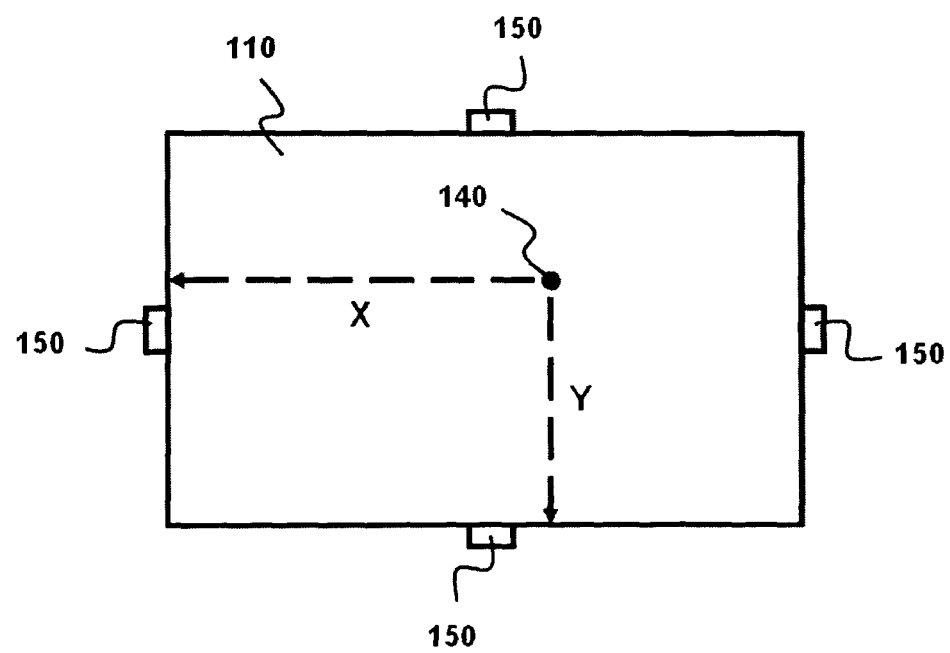
FIG. 4 is a top view for the elements of FIG. 3.

FIG. 3 illustrates another form of the present invention of touch sensing technology where the touch surface 110 is positioned between four force sensors 150 that are located at the middle points of the touch surface sides as shown in the figure, while a horizontal force 160 is exerted on the touch surface at the same touch point 140 of FIG. 1. FIG. 4 illustrates a top view for the touch surface and the four force sensors of FIG. 3, where x and y represent the Cartesian coordinates of the touch point relative to an origin which is the left bottom corner of the touch surface. Generally, the value of the horizontal force and its direction relative to the x-axis can be computed by analyzing the four forces that are exerted at the positions of the four force sensors, whereas these four force represented by the output of the four force sensors as will be described subsequently.

Figure 5:
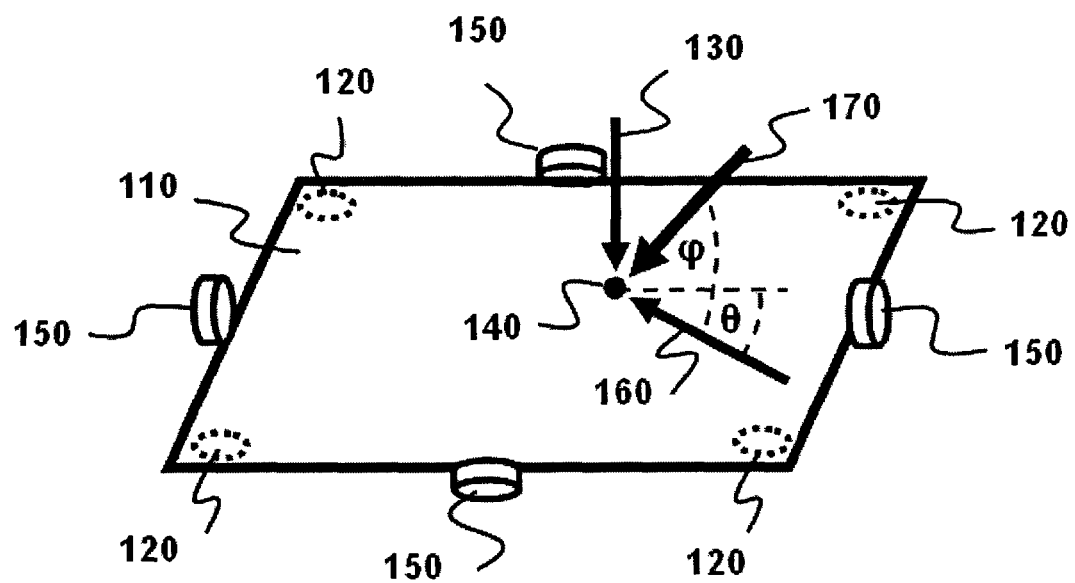
FIG. 5 is a force exerted on a surface connected to eight force sensors.
Figure 6:
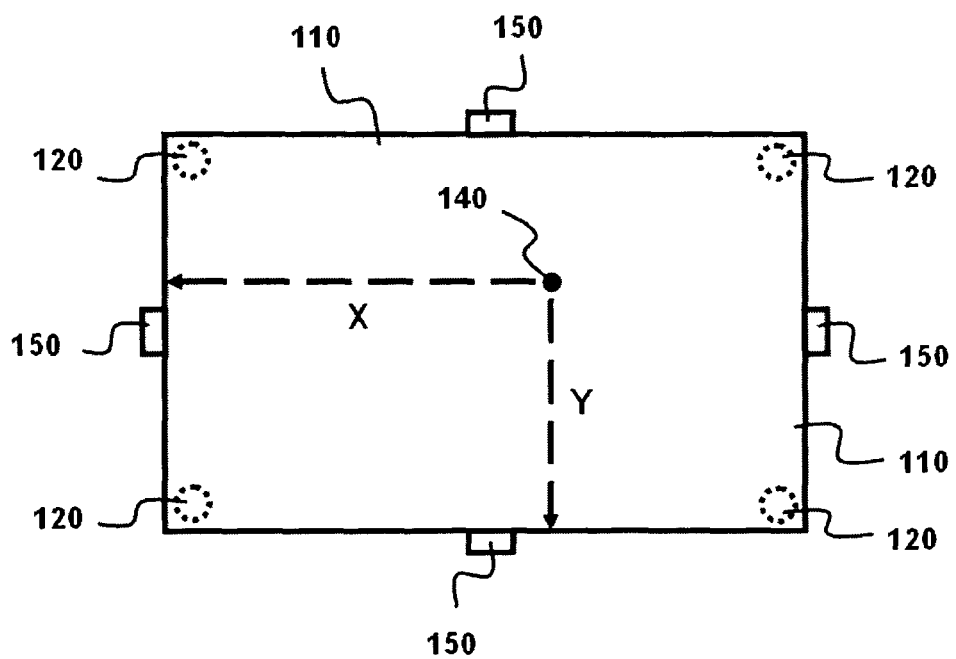
FIG. 6 is a top view for the elements of FIG. 5.

FIG. 5 illustrates combining the elements of FIGS. 1 and 3 together to present the touch surface, the four touch sensors 120 that are positioned vertically beneath the touch surface corners, and the four touch sensors 150 that are positioned horizontally at the middle points of the touch surface sides. The vertical force 130 and the horizontal force 160 can be combined into one resultant force 170 that touches the touch surface at the same touch point 140. As shown in the figure, θ represents the angle between the positive x-axis and a line representing the projection of the resultant force on the xy-plan, while φ represents the angle between the resultant force and the xy-plane. FIG. 6 illustrates a top view for the elements of FIG. 5. Generally, the values of the vertical force, the horizontal force, and the resultant force, in addition to, the values of θ, φ, x, and y can be computed using a specific algorithm as will be described subsequently.

Figure 7:
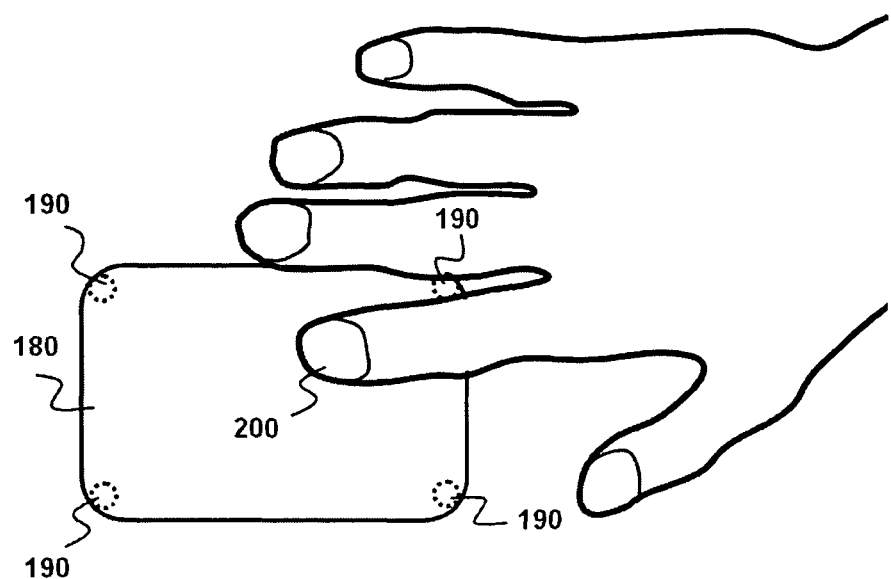
FIG. 7 is a touchpad utilizing the present touch sensing technology.

Overall, the concept of utilizing the force sensors can be implemented in various computer input devices. For example, FIG. 7 illustrates a touchpad comprised of a rectangular touch surface 180 where four force sensors 190 are positioned vertically beneath the four corners of the rectangular touch surface to be connected to a microprocessor. As shown in the figure, the user's finger touches the rectangular touch surface at a touch point 200, where the four force sensors provide the microprocessor with four signals that can be analyzed to compute the position of the touch point and the value of the vertical force.

The present touchpad has many advantages in comparison to the traditional touchpad. For example, the value of the vertical force can be utilized to represent the speed of moving objects on the computer display without utilizing additional buttons or using another finger. Moreover, in case of adding four force sensors to the boundary sides of the rectangular touch surface, as described previously, then the touchpad can detect the 3D direction of the exerted force which can be utilized to manipulate the objects to move in 3D on the computer display.

Figure 8:
FIG. 8 is a touch screen utilizing the present touch sensing technology.

FIG. 8 illustrates a portable touch screen comprised of a transparent sheet 210 which is a thin flexible sheet attached to four force sensors 220 at its four corners where the four sensors can be attached to the corners of a computer display and connected to the computer by a USB. When the user's finger touches the portable touch screen the transparent sheet compacts to exert tension forces on its four corners where the values of these tension forces are detected by the four force sensors, and provided to a microprocessor that computes the position of the user's finger along the transparent sheet. Said portable touch screen is a unique computer input device that converts the traditional computer display into a touch screen in a fast and simple manner.

Figure 9:
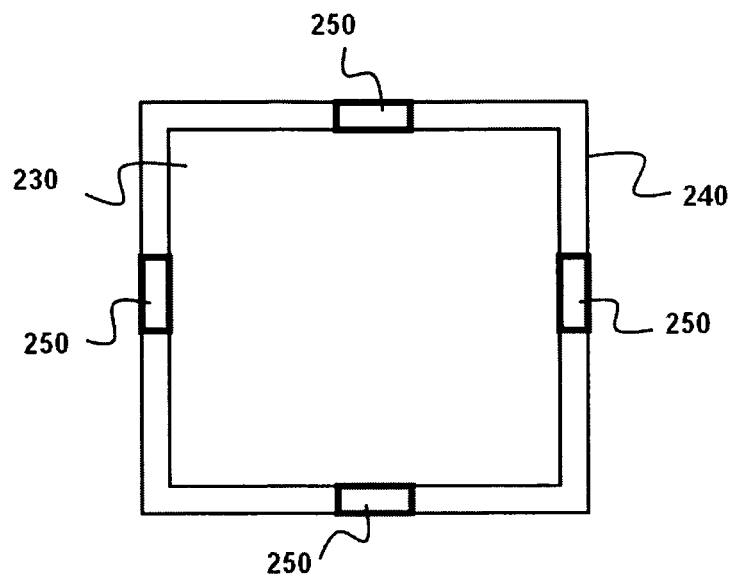
FIG. 9 is a computer mouse utilizing the present touch sensing technology.

FIG. 9 is a top view of a computer mouse comprised of; a top chassis 230, a bottom chassis 240 and four force sensors 240 located between the top chassis and the bottom chassis of the mouse. The user's hand holds the top chassis to exert a horizontal force in a specific direction on the mouse without moving it on a desk or surface, where the four force sensors provide four signals to a microprocessor representing the exerted forces on the four sides of the bottom chassis. The microprocessor receives the signals from the four force sensors and provides the computer system with an immediate input representing the direction of the exerted force on the mouse which manipulates the objects to move in the same direction on the computer display. In this case the value of the exerted force can be utilized to control the speed of moving the objects on the computer display.

Figure 10:
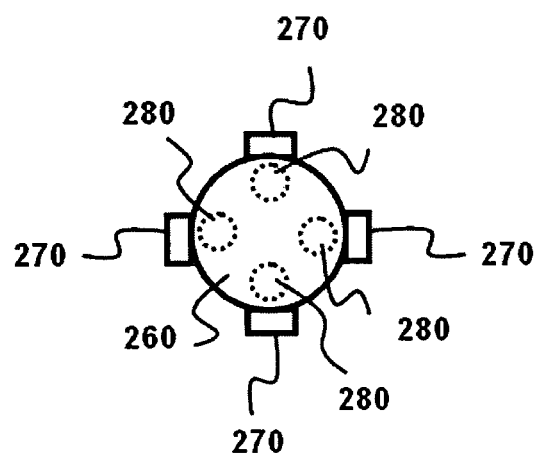
FIG. 10 is a keyboard button utilizing the present touch sensing technology.

FIG. 10 illustrates a keyboard button 260 comprised of; a first group of four force sensors 270 positioned to face the side surface of the keyboard button, and a second group of four force sensors 280 positioned beneath the keyboard button. As described previously this configuration of force sensors enables such keyboard button to detect the direction of the exerted force from the finger on the keyboard button when typing. Each different direction of said exerted force can be interpreted to provide the computer system with a unique input or a keyboard shortcut using one button only.

Figure 11:
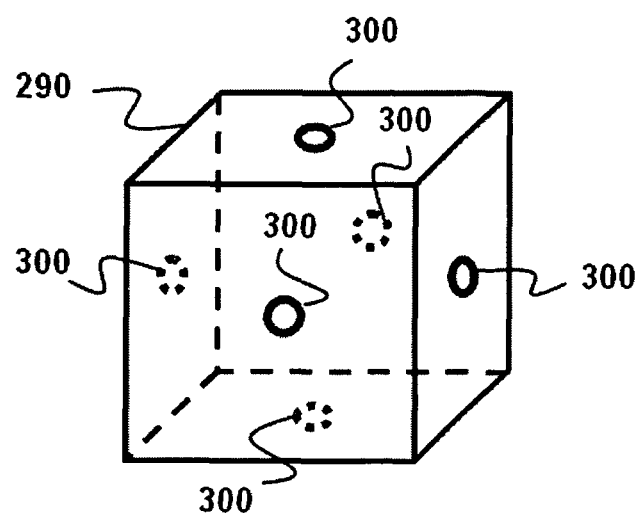
FIG. 11 is a 3D pointing stick utilizing the present touch sensing technology.

The idea of using the force sensors can be implemented in various 3D computer input devices that enable the user to manipulate the objects to move in 3D on the computer display. For example, FIG. 11 illustrates a cube 290 where each one of its faces is connected to a force sensor 300 as shown in the figure. The cube can be moved slightly while the force sensors can not be moved from their positions, accordingly, when user pushes the cube in a 3D direction the output of the force sensors can be analyzed to compute this 3D direction. The direction of pushing the cube in 3D represents the same direction of moving the objects in 3D on the computer display.

Figure 12:
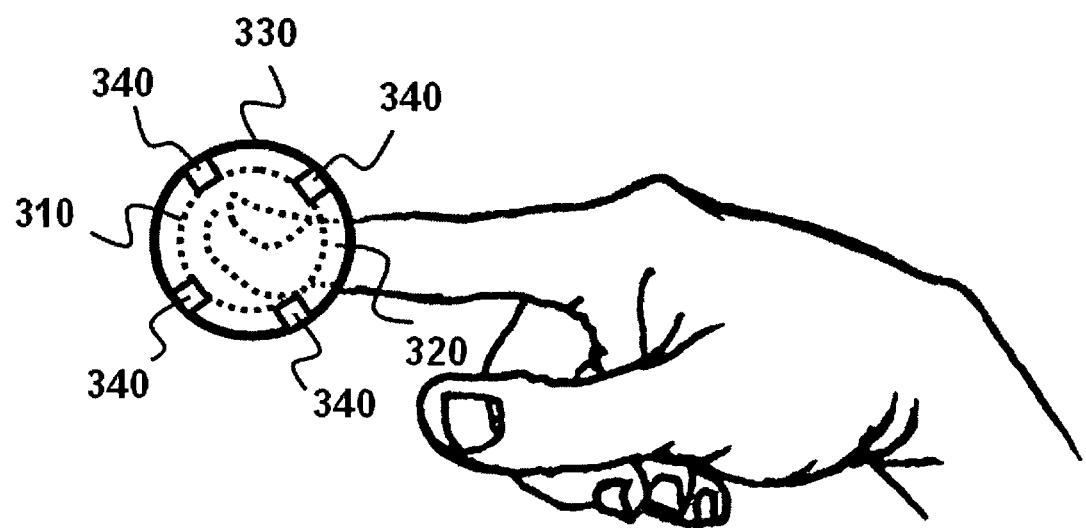
FIG. 12 is a 3D computer input device utilizing the present touch sensing technology.

FIG. 12 illustrates another innovative 3D input device that looks like a 3D pointing stick comprised of an interior sphere, an exterior sphere, and six force sensors. The interior sphere 310 is a hallow sphere that has an opening 320 to enable the user to insert his/her finger inside it, where this interior sphere is filled with an elastic material such as rubber. The exterior sphere 330 is a hallow sphere surrounds the interior sphere and fixed to an object to prevent it form moving with the movement of the interior sphere. The six force sensors 340 are located between the interior sphere and the exterior sphere to detect the movement of the interior sphere with the finger movement in three dimensions. The direction of moving or rotating the finger along/about the x, y, or z-axis inside the interior sphere represents the same direction of moving or rotating the objects along/about the x, y, or z-axis on the computer display.

Overall, the main advantage of the present invention is utilizing an existing hardware technology that is simple and straightforward which easily and inexpensively carry out the present touch sensing technology. For example, the force sensor can be a digital force sensor or an analog force sensor that detects the exerted force on its surface and generates a signal representing the value of this force. The two commercially available force sensors in the market are in a form of a push button and a fixable strip where both of them can be easily utilized with the present invention. The microprocessor receives the signal of the force sensors and provides the computer system with an immediate input representing a movement in two or three-dimensions on the computer display.

The algorithm of the present touch sensing technology depends on structurally analyzing the output of the force sensors to compute the position, the value, and/or the direction of the force that is exerted form an object on the touch surface. Generally, as described previously the elements of the present touch sensing technology has three different structural forms. The first structural form is illustrated in FIG. 1 where a vertical force is exerted on four vertical force sensors. The second structural form is illustrated in FIG. 3 where a horizontal force is exerted on four horizontal force sensors. The third structural form is illustrated in FIG. 5 where a force, that can analyzed into a vertical force and a horizontal force, is exerted on four vertical force sensors and four horizontal force sensors.

According to the structure analysis of the elements of FIG. 1 there are three unknown values and six known values. The three unknown values are the value of the vertical force, and x, and y, while the six known values are the four vertical reactions of the four sensors, and the length and width of the touch surface. Structurally analyzing the elements of FIG. 1 enables computing the three aforementioned unknown values. For example, the vertical force will be equal to the four reactions of the four force sensors, while the values of x and y can be obtained by solving two equilibrium equations of the vertical force and the four reactions of the four force sensors at any two corners of the touch surface. Generally, the following two equations represent the values of vertical force, and x and y;

$Fv=R1+R2+R3+R4$ $y=(0.5W-(LR2+WR4+(L^2+W^2)^{0.5}R3)^2/2WFv^2)+(WR1+LR3+(L^2+W^2)^{0.5}R2)^2/2WFv^2$ $x=(((WR1+LR3+(L^2+W^2)^{0.5}R2)^2/Fv^2)-y^2)^{0.5}$

In the previous equations, "Fv" represents the value of the vertical force. R1 represents the reaction of the first force sensor that is located on the upper left corner, R2 represents the reaction of the second force sensor that is located on the upper right corner, R3 represents the reaction of the third force sensor that is located on the lower right corner, and R4 represents the reaction of the fourth force sensor that is located on the lower left corner of the touch surface. "x" and "y", respectively, represent the horizontal distance and the vertical distance of vertical force relative to the left bottom corner of the touch surface. "L" represents the length of the touch surface, and "W" represents the width of the touch surface.

According to the structure analysis of the elements of FIG. 3 there are two unknown values and six known values. The two unknown values are the value of the horizontal force, and its direction relative to the positive x-axis, and the four known values are the four horizontal reactions of the four force sensors. Structurally analyzing the elements of FIG. 3 enables computing the two aforementioned unknown values. For example, if the direction of the horizontal force is located between the first force sensor and the second force sensor then;

$\tan\theta=R1/R2$ and $Fh=R1/\sin\theta$

If the direction of the horizontal force is located between the first force sensor and the fourth force sensor then;

$\tan(\theta-90)=R4/R1$ and $Fh=R4/\sin(\theta-90)$

If the direction of the horizontal force is located between the third force sensor and the fourth force sensor then;

$\tan(\theta-180)=R3/R4$ and $Fh=R3/\sin(\theta-180)$

If the direction of the horizontal force is located between the second force sensor and the third force sensor then;

$\tan(\theta-270)=R2/R3$ and $Fh=R2/\sin(\theta-270)$

In the previous equations, "Fh" represents the value of the horizontal force. R1, R2, R3, and R4 represent the four reactions of the four force sensors that are, respectively, located at the top side, right side, bottom side, and left side of the touch surface, while $\theta$ represents the angle between the horizontal force and the positive of the x-axis.

According to the structure analysis of the elements of FIG. 5, the force 170 can be analyzed into a vertical force 130 and a horizontal force 160. The value of the vertical force and its position along the touch surface can be computed according to the previous equations of FIG. 1, while the value of the horizontal force and its direction relative to the positive x-axis can be computed according to the previous equations of FIG. 3. Knowing the value of the vertical force and the value of the horizontal force enables computing the value of "φ" which represents the direction of the force relative to the xy-plan according to the following equation;

$\tan\phi=Fv/Fh$ $F=Fv/\sin\phi$

It is important to note that in case of using the portable touch screen of FIG. 8, the user's finger makes the transparent sheet compact to exert tension forces on the four force sensors that are attached to the corners of the transparent sheet instead of exerting compression forces on the four force sensors as the case of FIG. 1. Also when utilizing the cube and the six force sensors of FIG. 11, in this case the exerted force on the cube will be analyzed in three directions along the x, y, and z-axis instead of analyzing it in two direction only as the case of FIG. 3. This rule of analyzing the force in three directions along the x, y, or z-axis is also applied on the 3D pointing stick of FIG. 12.

It is also important to note that the touchpad of FIG. 7 and the portable touch screen of FIG. 8 can detect the position of one finger only. To enable the touchpad and the portable touch screen to detect the positions of more than \one finger, in this case, the number of the force sensors is increased. Increasing the number of the force sensors increases the number of the known variables in the equilibrium equations which enables computing more unknown variables such as the positions of more than one force or finger.

Overall, as discussed above, a touch sensing technology is disclosed, while a number of exemplary aspects and embodiments have been discussed above, those skilled in the art will recognize certain modifications, permutations, additions and sub-combinations thereof. It is therefore intended that claims hereafter introduced are interpreted to include all such modifications, permutations, additions and sub-combinations as are within their true spirit and scope.

The invention claimed is:

1. A device that detects the three-dimensional direction and the value of a force exerted from an object on a surface, wherein the three-dimensional direction is represented by a first angle located between the surface plane and a line representing the three dimensional direction, and a second angle located between the projection of the line on the surface plane and the x-axis of the surface plane, and said device is comprised of;

a touching cube with six faces wherein each face of the six faces is a surface that can be touched by the object to move the touching cube in three simultaneous directions relative to the x-axis, the y-axis, and the z-axis;

six force sensors wherein each one of the six force sensors is in touch with one face of the touching cube to detect the value of the force exerted on the one face wherein the value of the force exerted on the one face represents the movement of the one face along an axis, and three force sensors of the six force sensors simultaneously detect three values of three forces exerted on three faces of the six faces when the touching cube is moved in the three simultaneous directions; and a microprocessor that simultaneously receives the three values from the three force sensors and analyzes the three values relative to each other to provide a computer system with a first input representing the three-dimensional direction, and a second input representing the value of the force exerted from the object on the surface.

2. The device of claim 1 wherein the first direction of said three simultaneous directions is the positive x-axis or the negative x-axis, the second direction of said three simultaneous directions is the positive y-axis or the negative y-axis, and the third direction of said three simultaneous directions is the positive z-axis or the negative z-axis.

3. The device of claim 1 wherein said touching cube returns to its default position once said force is released.

4. The device of claim 1 wherein each one of said six force sensors is two or more force sensors.

5. The device of claim 1 wherein said three-dimensional direction represents a three-dimensional direction of an object's movement on a computer display.

6. The device of claim 1 wherein said value of said force represents a speed of an object's movement on a computer display.

7. The device of claim 1 wherein the movement of said touching cube relative to one axis of the x-axis, the y-axis, or the z-axis is equal to zero, which means said touching cube is moved only in the xy-plane, the xz-plane, or the yz-plane.

8. The device of claim 1 wherein said object is two objects simultaneously touching said touching cube at two points on one face of said six faces, and said three-dimensional direction represents the resultant direction of the two forces of said two objects, and said value represents the resultant value of said two forces.

9. The device of claim 1 wherein said object is two objects simultaneously touching said touching cube at two points on two faces of said six faces, and said three-dimensional direction represents the resultant direction of the two forces of said two objects, and said value represents the resultant value of said two forces.

10. The device of claim 1 wherein said touching cube is a panel that has a top side, a bottom side and four edges, and said six force sensors are five force sensors in touch with said bottom side and said four edges, and said object touches said panel only at said top side.

11. The device of claim 1 wherein said touching cube is in the form of other three-dimensional objects than a cube and at least one force sensor is in touch with each face of the faces of said other three-dimensional objects.

12. The device of claim 1 wherein said touching cube is a sphere with an interior void that allows said object to be positioned inside said interior void to exert said force on said sphere.

13. The device of claim 12 wherein the exterior surface of said sphere is fixed, which means said exterior surface doesn't move when said force is exerted.

14. The device of claim 12 wherein said force sensors are located between said interior void and the exterior surface of said sphere.

\* \* \* \* \*